Aug. 2, 1960     A. L. WILSON     2,947,450
COMBINATION SPREADER BOX AND GRAIN DRILL
Filed May 14, 1958     3 Sheets-Sheet 1
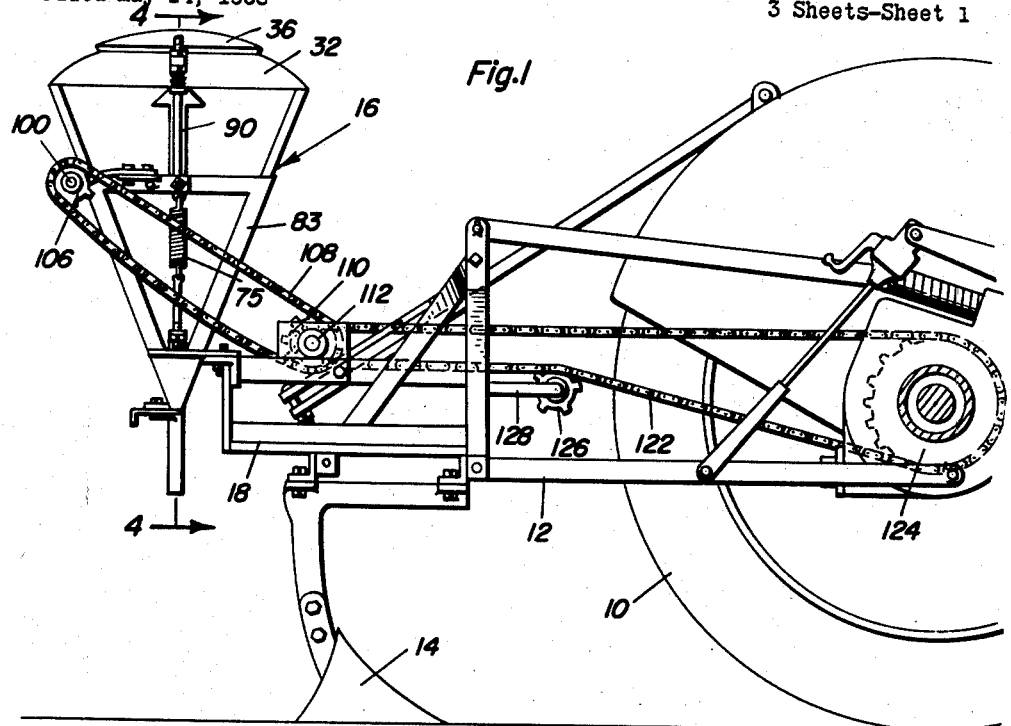
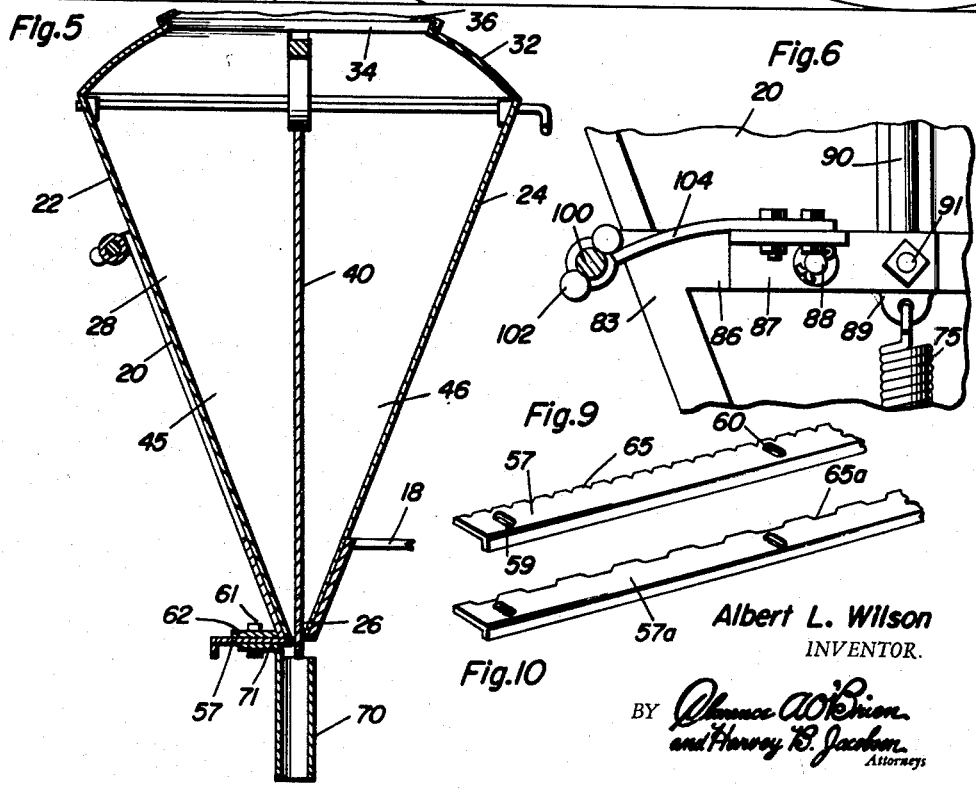
Albert L. Wilson
INVENTOR.

Aug. 2, 1960
A. L. WILSON
2,947,450
COMBINATION SPREADER BOX AND GRAIN DRILL
Filed May 14, 1958
3 Sheets-Sheet 2
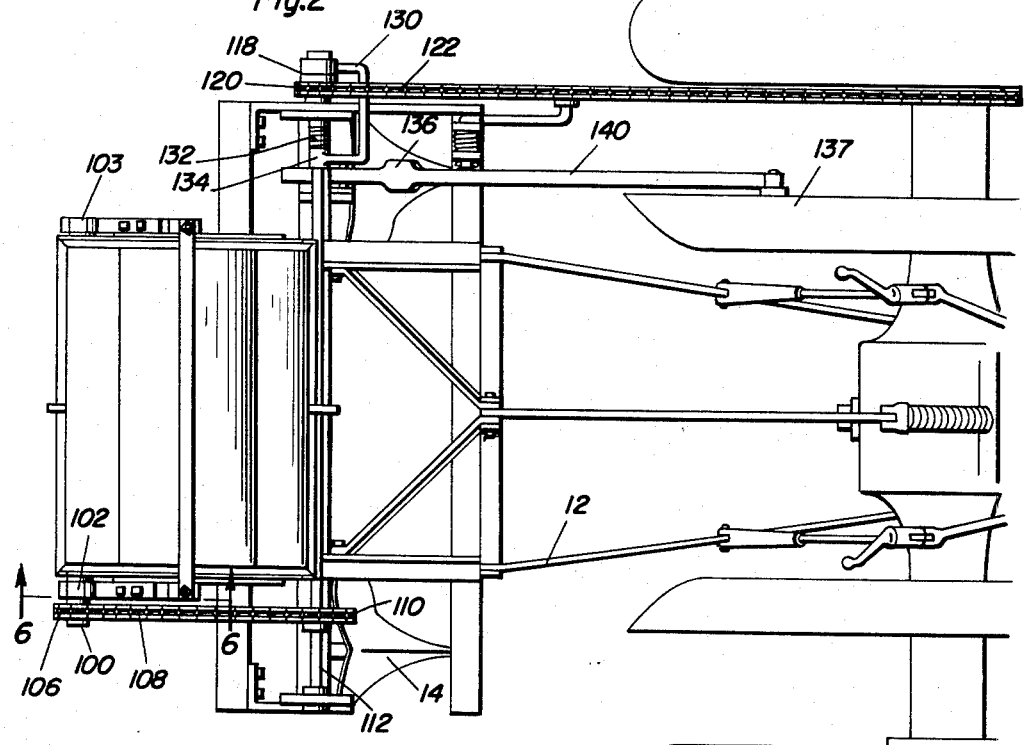
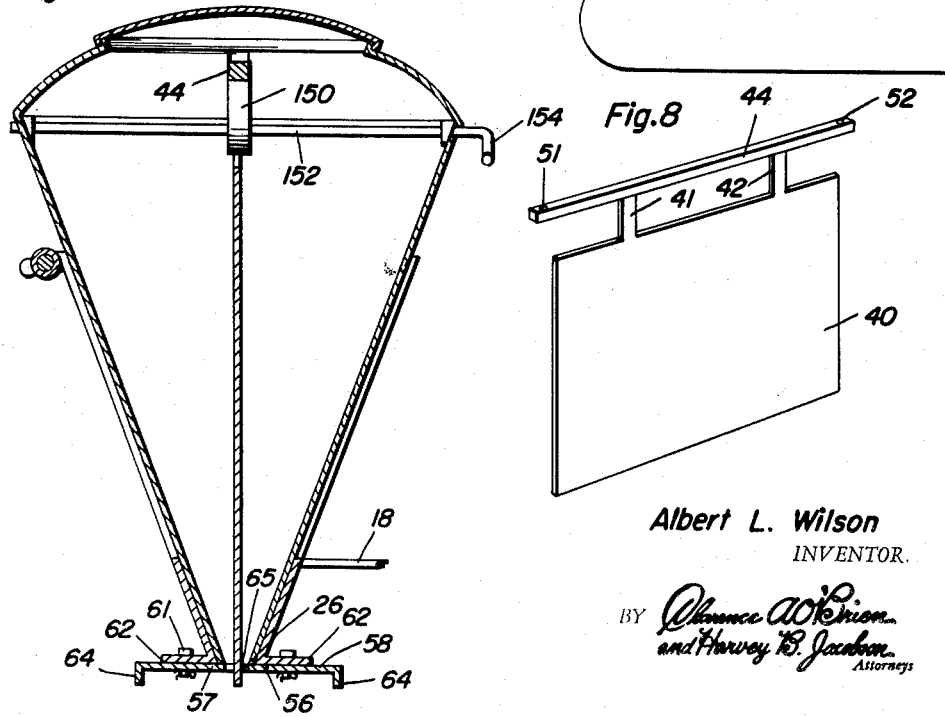
Albert L. Wilson
INVENTOR.
BY
*Attorneys*

Aug. 2, 1960     A. L. WILSON     2,947,450
COMBINATION SPREADER BOX AND GRAIN DRILL
Filed May 14, 1958     3 Sheets-Sheet 3
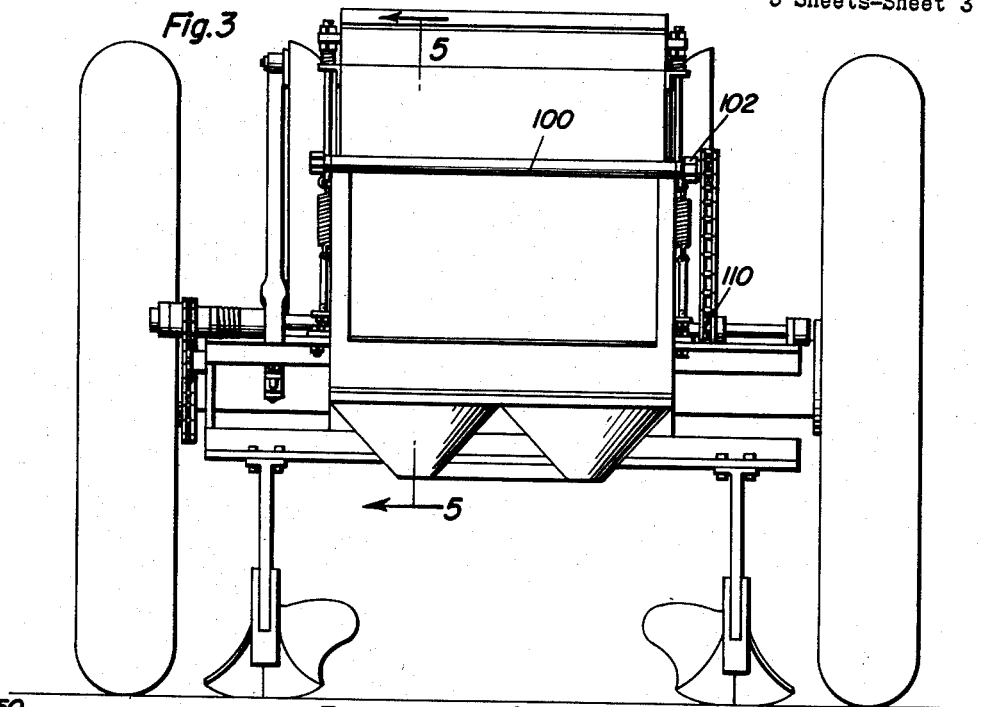
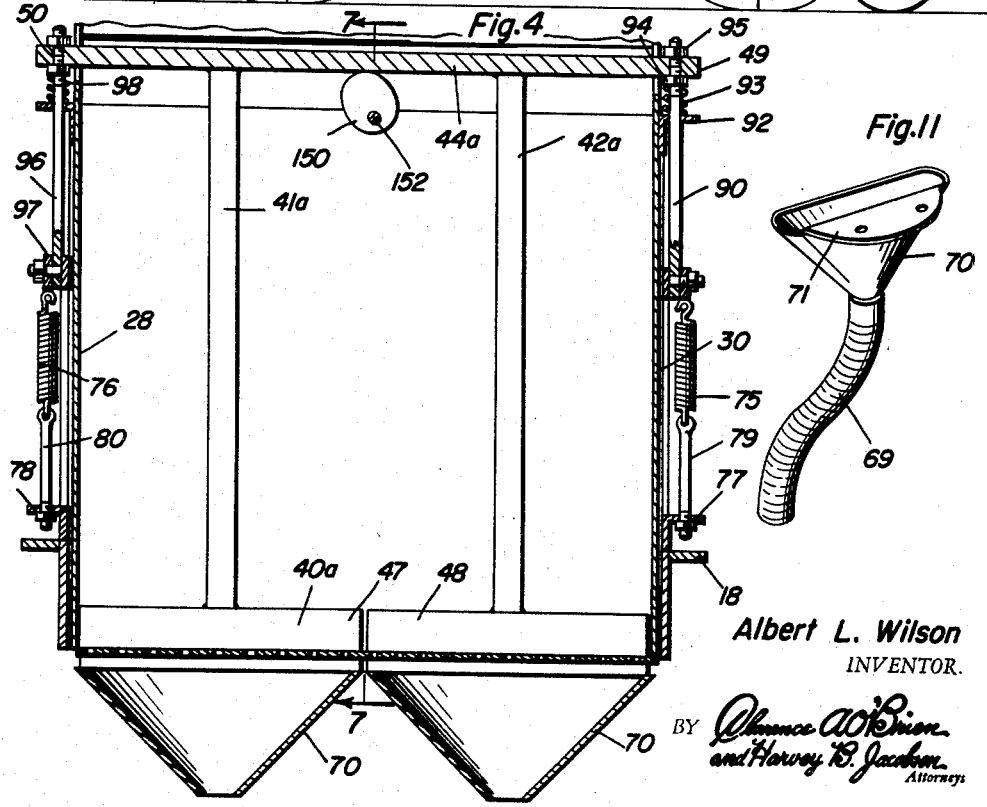
Albert L. Wilson
INVENTOR.

United States Patent Office
2,947,450
Patented Aug. 2, 1960

2,947,450
COMBINATION SPREADER BOX AND GRAIN DRILL

Albert L. Wilson, Palo Pinto, Tex., assignor of fifty percent to Ben H. Martin, Mineral Wells, Tex.

Filed May 14, 1958, Ser. No. 735,254

4 Claims. (Cl. 222—136)

This invention relates to a combination farm implement and more particularly to a combined fertilizer and/or grain distributor.

An object of the invention is to provide improvements in farm implements and especially those implements that are used for the purpose of distributing materials. This invention provides a positive force feed of any texture materials with all bearings and turning parts on the outside of the box thereby eliminating freezing and corroding that is attributable to the material that is being handled.

An implement in accordance with the invention requires very little power to operate because the action is by a reciprocating plunger plate which moves up and down. It has been found that the plunger plate can move up and down very easily by hand when fully loaded and tightly packed with fertilizer and/or grain. This invention provides a number of adjustments to control the rate of flow, the length of stroke of the plunger plate and the tension in springs for heavy or light stroke depending on the weight of material used. Once set by adjustment, a uniform flow of material is achieved until readjusted.

This machine in operation will effect a flow that can be completely stopped at the will of the operator or can be stopped automatically when the plows on the same tractor that supports the implement are lifted in turning and travelling between work thereby eliminating waste of the material that is being distributed. In available distributors a difficulty is experienced in having the materials clog at the discharge end of the box. By this implement having a reciprocating substantial plunger plate, the material in the entire box is continually agitated thereby preventing clogging and maintaining a uniform flow independently of the packing or quantity of material in the box. When the implement is finished its job, it can be emptied very easily by simple manual manipulation. Since there are no gears or turning parts in the box, the motion will not stop since there is nothing by which to become bound insofar as turning parts are concerned. The rotating distributors have always had difficulty because small pebbles, etc. have had a tendency to prevent the parts from rotating thereby causing damage or cessation in the operation of the implement.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a part of a tractor, the plows and conventional tractor lift on which the plows are supported together with an implement constructed in accordance with the invention.

Figure 2 is a top view of the structure in Figure 1.

Figure 3 is a rear view of the structure in Figure 1.

Figure 4 is a sectional view taken on the line 4—4 of Figure 1 and transversely through the implement of the invention.

Figure 5 is a sectional view taken on the line 5—5 of Figure 3.

Figure 6 is a fragmentary enlarged detail of construction and taken on the line 6—6 of Figure 2.

Figure 7 is a cross-sectional view of the implement and taken on the line 7—7 of Figure 4.

Figure 8 is a perspective view of the plunger plate constituting a part of the invention.

Figure 9 is a perspective view of a control plate at the bottom of the box.

Figure 10 is a perspective view of a second control plate that can be substituted for the control plate of Figure 9.

Figure 11 is a fragmentary perspective view of an attachment for the implement that is to be used when grain is being discharged from the box.

In the accompanying drawings there is a fragmentary part of a tractor 10. This tractor has a conventional tractor lift 12 protruding from the aft end thereof and operatively connected with the tractor in the customary way. The lift 12 is hydraulically operated and is quite common. Plows 14 are attached to the lift and these, too, are conventional. The combination spreader box and grain drill implement 16 is mounted on the back part of the lift 12 by means of a support structure or support 18 which may be bolted or otherwise secured in place. The box 20 of the implement is of considerable importance in its details of construction. It has a back wall 22 and a front wall 24 which slope downwardly toward the discharge port 26 that runs transversely across the bottom of the box. The box 20 has two side walls 28 and 30 which are attached to the front and rear walls respectively. A curved top 32 is connected with the upper edges of the four walls of the box and has an inlet opening 34 through which grain, fertilizer and the like may be passed. A closure 36 is separably attached to the top 32 and is removed or hinged to an open position when the box is to be filled.

The plunger plate 40 (Figure 8) is made of a rectangular rigid plate with two brackets 41 and 42 protruding upwardly from its upper edge. The plate extends transversely across a center plane of the box and has a bar 44 attached at the upper edge of brackets 41 and 42. The bar has holes in its ends and these ends protrude beyond the reaches of the end walls 28 and 30. Plunger plate 40 functions not only as a plunger but also as a partition dividing the box into chambers 45 and 46 (Figure 5). The lower end portion of the plunger plate 40 passes into and may even pass through port 26 (Figure 5) to preserve the separation of the chambers 45 and 46. An alternative construction is seen in Figure 4. Here, bar 44a is attached to the upper ends of brackets 41a and 42a, and the plunger plate 40a is in two sections 47 and 48 welded or otherwise secured to the lower end of brackets 41a and 42a. Bar 44a has holes 49 and 50 at its ends which serve the same purpose as the holes 51 and 52 at the ends of bar 44. It is seen from Figure 4 that the plunger plate 40a does not separate the box into separate compartments. Accordingly all material in the box can commingle when plunger plate 40a is used, but when plunger plate 40 is used, the chambers 45 and 46 are maintained discrete.

A direct discharge can be achieved as shown in Figure 7. The material in the box can be passed through port 26 directly to the soil with the only limitation caused by quantity control mechanism 56. This quantity control mechanism consists of a pair of control plates or valves 57 and 58 that have slots 59 and 60 spaced along the length thereof. Bolts 61 are passed through openings in lateral flanges 62 at the bottom edges of the front and rear wall of the box and through slots 59 and 60. By tightening the bolts after adjusting the control plates to the selection positions, and small flanges 64 are on the control plates or valves to facilitate adjustment, they may be tightened thereby regulating the effective opening of port 26. The confronting edges 65 of the control plates or valves have notches or are otherwise serrated so that the configuration of the port 26 can be altered. As shown in Figures 9 and 10 control plate 57 can have its edge 65 with fine notches or control plate 57a can be used. The difference between control plate 57 and 57a is in the edges 65 and 65a and more explicitly, in the configuration of the notches thereof. Any number of variations may be made in these notches.

It is unnecessary to have two control plates for each spreader box. For instance, Figure 5 shows only one control plate 57 attached to one laterally protruding flange 62 by a group of bolts 61. In either case, when fertilizer or other similar substance is being discharged, there is no need for seed ducts 69 (Figure 11). When seed is being distributed seed ducts are suggested. The duct 69 is made of a flexible tube with a funnel 70 at its upper end. A bolting flange 71 is at one edge of the funnel and is adapted to be fastened to the bottom part of the spreader box, for example, by being attached in place by bolts 61.

The bar 44 (or 44a) is constrained in its reciprocatory travel by two springs 75 and 76 that have their lower ends attached to brackets 77 and 78 on the ends of the spread box. Eye-bolts 79 and 80 connected the lower ends of the springs 75 and 76 to the brackets 77 and 78. The upper ends of the springs are attached to a frame 83 that is secured to support 18 and within which the box 20 is fitted. The frame 83 is shaped to conform to the shape of the lower part of the box and the box fits neatly in the frame. For a more explicit picture of this structure reference is made to Figure 6. Frame 83 has a cross member 86 on which an oscillatory arm 87 is mounted for limited movement. The oscillatory arm or lever has a pivot 88 passed through a hole in it and connecting to the frame cross member 86. An ear 89 depends from the arm or lever 87 and has the upper end of spring 75 connected in it. Rod 90 is attached to the lever 87 by bolt 91 and at its lower end. The upper end of the rod is passed through a hole in a lateral flange 92 of frame 83. Spring 93 reacts on flange 92, being seated thereon, and on a nut 94 beneath a hole 49 in bar 44 or 44a. Another nut 95 is on the other side of the hole 49. Rod 96 is connected to a lever 97 on the other side of frame 83. Spring 98 which responds to spring 93 in structure and function, seats on a flange of the frame 83 near its upper part and seats on one of the two nuts on opposite sides of the bar 44 or 44a and carried by the upper end of the rod 96. In this way the plunger plate 40 or 40a is constrained in its motion by the action of the four described springs. The motion is imparted to the plunger plates by rocking movement of the levers 87 and 97 and this movement is uniform in the sense that both levers are rocked simultaneously and through equal travels. Cam shaft 100 extends transversely across the back of the box and is mounted on a part of frame 83. Each end of the cam shaft has a pair of cams 102 and 103 thereon and in contact with an arm 104 (Figure 6) that is attached to lever 97 and 87 respectively. Accordingly, as the cam shaft 100 rotates the cams 102 and 103 thereon will pivotally oscillate the levers 87 and 97 thereby agitating or reciprocating the plunger plate that is being used.

Cam shaft 100 has a sprocket 106 on one end and around which chain 108 is engaged. This chain is also engaged over a sprocket 110 secured to shaft 112. This shaft is mounted in bearings and extends transversely across the port 18 in order to obtain power from the tractor, for example by having a driving connection with one wheel of the tractor through clutch 118. The clutch is at the end of shaft 112 and is constructed to engage and disengage sprocket 120 with shaft 112. The sprocket has a chain 122 entrained over a sprocket 124 that is driven by the wheel of the tractor. A chain tightener idler sprocket 126 is mounted on an adjustable arm 128 carried by a part of support 18. The sprocket 126 is in engagement with a convenient part of the chain 122 between the sprockets 120 and 124.

Clutch 118 has a clutch operating arm 130 that is held in a position corresponding to the clutch engaging position by spring 132 on shaft 112. The clutch 118 is conventional, but its application is deemed new. The clutch holds a drive connection between the tractor wheel and shaft 112 but can be disengaged by moving the clutch operating arm 130 in one direction (against the opposition of spring 132). Accordingly, the clutch operator is of special construction. It is an approximately U-shaped arm with a bearing 134 at one end and slidable axially on shaft 112. The arm is adapted to be engaged by a cam 136 that is carried by the fender 137 of the tractor or some other convenient part of the tractor. When reaching the end of a row or at any other time that the farmer wishes, the entire spreader box plus the plows and anything else connected to the tractor lift 12 can be raised. However, the arm 140 on which cam 136 is fixed, does not move. Therefore, the cam 136 can be located in the path of travel of clutch operator 130. In so doing the cam 136 is engaged by a part of the clutch operator 130 and is moved in a direction to disengage the clutch 118 automatically when the lift 12 is raised. This opens the drive connection between the tractor and the means for actuating the plunger plate.

There are in addition to the cam 136, further means for preventing the flange plate from being reciprocated. These means are composed of a cam 150 on a shaft 152 that extends through bearings in the front and back walls of the box. The cam is located beneath bar 44 or bar 44a (Figures 4 and 7), and the shaft 152 has a handle 154 at its end. The shape of the cam 150 is such that when the cam is rotated to one position, the lobe of the cam engages the bottom surface of the bar 44 or bar 44a and elevates the plunger plate keeping in a position where the cams 102 and 103 on cam shaft 100 are not contacted by the arms 104 of levers 87 and 97. Therefore, the cam shaft 100 can continue to rotate without effect. To release the plunger plates to their operative position, handle 154 is turned far enough to separate the lobe of the cam from engagement with the lower surface of the bars 44 or 44a.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combination implement adapted to distribute grain and/or fertilizer, said combination implement comprising a spreader box that has a transverse long and narrow discharge port at its lower end, a plunger plate mounted for reciprocation in said box and operable in alignment with said port, said plunger plate being flat and having a lower edge portion continually extending through said port with a clearance between the surfaces of said plunger plate and the edges of said port, at least one control plate in registry with said port at one side thereof and movable to positions to adjust said clearance, means adjustably securing said control plate to said box, a cam shaft, means for rotating said cam shaft, said cam shaft having at least one cam thereon, a lever, means mounting said lever for oscillation with a portion thereof in engagement with said cam of said cam shaft, resilient means opposing the movement of said lever and attached to said lever, means connected to said plunger plate and to said lever for transmitting motion from said lever to reciprocatory motion of said plunger plate, manually operable means carried by said box and adapted to contact said means for connecting said lever to said plate for holding said plate temporarily in a predetermined position.

2. A combination implement adapted to distribute grain and/or fertilizer, said combination implement comprising a spreader box that has a transverse long and narrow discharge port at its lower end, a plunger plate mounted for reciprocation in said box and operable in alignment with said port, said plunger plate being flat and having a lower edge portion continually extending through said port with a clearance between the surfaces of said plunger plate and the edges of said port, at least one control plate in registry with said port at one side thereof and movable to positions to adjust said clearance, means adjustably securing said control plate to said box, a cam shaft, means for rotating said cam shaft, said cam shaft having at least one cam thereon, a lever, means mounting said lever for oscillation with a portion thereof in engagement with said cam of said cam shaft, resilient means opposing the movement of said lever and attached to said lever, means connected to said plunger plate and to said lever for transmitting motion from said lever to reciprocatory motion of said plunger plate, said means for rotating said cam shaft including a driven shaft, a clutch on said driven shaft, means including a support structure for supporting said box and said last mentioned shaft, said support structure adapted to be raised and lowered, said clutch having a clutch operator, and means that are located in the path of travel of said clutch operator to actuate said clutch operator in response to raising of said support structure and thereby disengaging said clutch when said box is elevated.

3. A combination implement adapted to distribute grain and/or fertilizer, said combination implement comprising a spreader box that has a transverse long and narrow discharge port at its lower end, a plunger plate mounted for reciprocation in said box and operable in alignment with said port, said plunger plate being flat and having a lower edge portion continually extending through said port with a clearance between the surfaces of said plunger plate and the edges of said port, at least one control plate in registry with said port at one side thereof and movable to positions to adjust said clearance, means adjustably securing said control plate to said box, a cam shaft, means for rotating said cam shaft, said cam shaft having at least one cam thereon, a lever, means mounting said lever for oscillation with a portion thereof in engagement with said cam of said cam shaft, resilient means opposing the movement of said lever and attached to said lever, means connected to said plunger plate and to said lever for transmitting motion from said lever to reciprocatory motion of said plunger plate, said means for rotating said cam shaft including a driven shaft, a clutch on said driven shaft, means including a support structure for supporting said box and said last mentioned shaft, said support structure adapted to be raised and lowered, said clutch having a clutch operator, and means that are located in the path of travel of said clutch operator to actuate said clutch operator in response to raising of said support structure and thereby disengaging said clutch when said box is elevated, manual means including a shaft carried by said box and having a cam thereon, for moving said plunger plate and holding said plunger plate in a fixed position to thereby prevent said lever from reciprocating said plunger plate.

4. A combination implement adapted to distribute grain and/or fertilizer, said combination implement comprising a spreader box that has an elongated narrow discharge port at the lower end, a flat plate forming a plunger mounted for reciprocation in said box and operable in alignment with said port, the lower edge portion of said plunger always occupying said port with clearance between the surface of said plunger and the elongated edges of said port, at least one control plate in registry with said port, means adjustably securing said control plate to said box, a cam shaft, means for rotating said cam shaft, said cam shaft having at least one cam thereon, a lever, means mounting said lever for oscillation with a portion thereof in engagement with said cam of said cam shaft, resilient means opposing the movement of said lever and attached to said lever, means connected to said plunger plate and to said lever for transmitting motion from said lever to reciprocatory motion of said plunger plate, said plunger plate divides said box into separate compartments so that different materials can be maintained separate from each other in said box.

References Cited in the file of this patent
UNITED STATES PATENTS

| | | |
|---|---|---|
| 108,262 | Hinkley | Oct. 11, 1870 |
| 417,605 | Thaden | Dec. 17, 1889 |
| 683,157 | Trimble | Sept. 24, 1901 |
| 2,591,894 | Voges | Apr. 8, 1952 |
| 2,639,571 | Kelly | May 26, 1953 |

FOREIGN PATENTS

| | | |
|---|---|---|
| 387,160 | Germany | Dec. 27, 1923 |